United States Patent [19]

Koenig

[11] 3,954,957

[45] May 4, 1976

[54] PRODUCTION OF ALUMINA MONOHYDRATE PIGMENT

[75] Inventor: James J. Koenig, Belleville, Ill.

[73] Assignee: Aluminum Company of America, Pittsburgh, Pa.

[22] Filed: Feb. 24, 1975

[21] Appl. No.: 552,642

[52] U.S. Cl................................ 423/626; 106/309; 106/288 B
[51] Int. Cl.² .......................................... C01F 7/02
[58] Field of Search............................ 423/626, 625

[56] References Cited
UNITED STATES PATENTS

| | | | |
|---|---|---|---|
| 1,953,201 | 4/1934 | Tosterud............................ | 260/198 |
| 2,656,250 | 10/1953 | Thibon et al. ...................... | 428/402 |
| 2,915,475 | 12/1959 | Bugosk ............................... | 423/626 |
| 3,353,910 | 11/1967 | Cornelius et al..................... | 423/626 |
| 3,385,663 | 5/1968 | Hughes............................... | 423/626 |
| 3,480,389 | 11/1969 | Graulier.............................. | 423/626 |

FOREIGN PATENTS OR APPLICATIONS 1,008,828   5/1952   France

*Primary Examiner*—Herbert T. Carter
*Attorney, Agent, or Firm*—John P. Taylor

[57] ABSTRACT

Alumina monohydrate crystals of uniform particle size in the range of 0.2–0.7 microns suitable for use as pigments in paper, paints, or ink are produced by grinding Bayer trihydrate to a median particle size of 1–3 microns followed by digestion in the presence of a controlled amount of mineral acid.

5 Claims, 4 Drawing Figures

PRODUCTION OF ALUMINA MONOHYDRATE PIGMENT

BACKGROUND OF THE INVENTION

This invention relates to the production of alumina monohydrate. More particularly, this invention relates to the production of a pigment grade alumina monohydrate characterized by a uniform particle size.

It is known to produce alumina monohydrate by digestion in water or steam. It is also known that the presence of acid in this digestion is beneficial. For example, Tosterud U.S. Pat. No. 1,953,201, issued Apr. 3, 1934 and assigned to the assignee of this invention, produced a very finely divided alumina hydrate by subjecting alumina trihydrate to a digestion which usually comprises two steps involving a first digest in water, an alkaline solution, or simply heating the trihydrate followed by a subsequent digest in either an acidic or alkaline media. In one instance, the fine hydrate was produced from Bayer scale using a single treatment. Hughes U.S. Pat. No. 3,385,663 also produces hydrate by subjecting alumina trihydrate to an acid digest which results in the formation of a monohydrate so finely divided so as to form a colloidal dispersion in water.

Particles produced by these processes, however while undoubtedly useful in certain applications, are too small to have good optical properties in paper, paint, or ink.

Thibon et al U.S. Pat. No. 2,656,250 and French Pat. No. 1,008,828 describe a process for the production of fine particle size monohydrates using trihydrate seed formed by a precipitation process. Such preliminary processing of the trihydrate to obtain the finely divided seed particles adds additional cost to the process.

SUMMARY OF THE INVENTION

Quite surprisingly, it has been found that preliminary grinding of Bayer trihydrate to an average particle size (Fisher) of about 1–3 microns will, upon subsequent digestion in the presence of a controlled amount of mineral acid at a temperature of about 180°–250°C for about 0.5–120 minutes produce an alumina monohydrate product of uniform particle size and in a particle size range of 0.2–0.7 microns. This uniformity of particle size was quite unexpected because the preliminary grinding step resulted in a particle size distribution which, in weight percent, ranged from 10% of the particles being 3 microns or larger to 20% of the particles being 1 micron or smaller.

DESCRIPTION OF THE PREFERRED EMBODIMENTS

Figure 1:
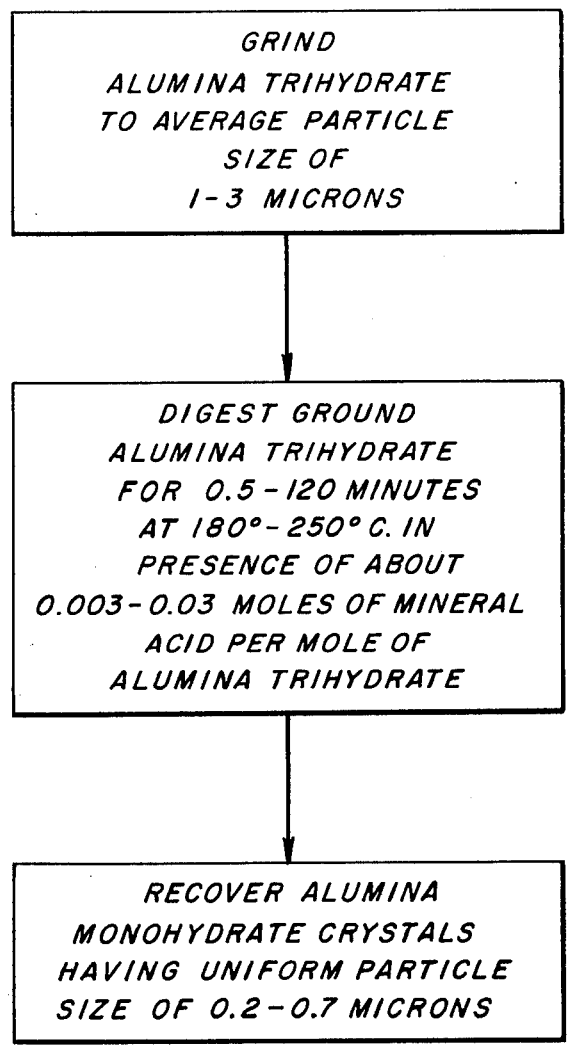
FIG. 1 is a flowsheet of the invention.
Figure 2:
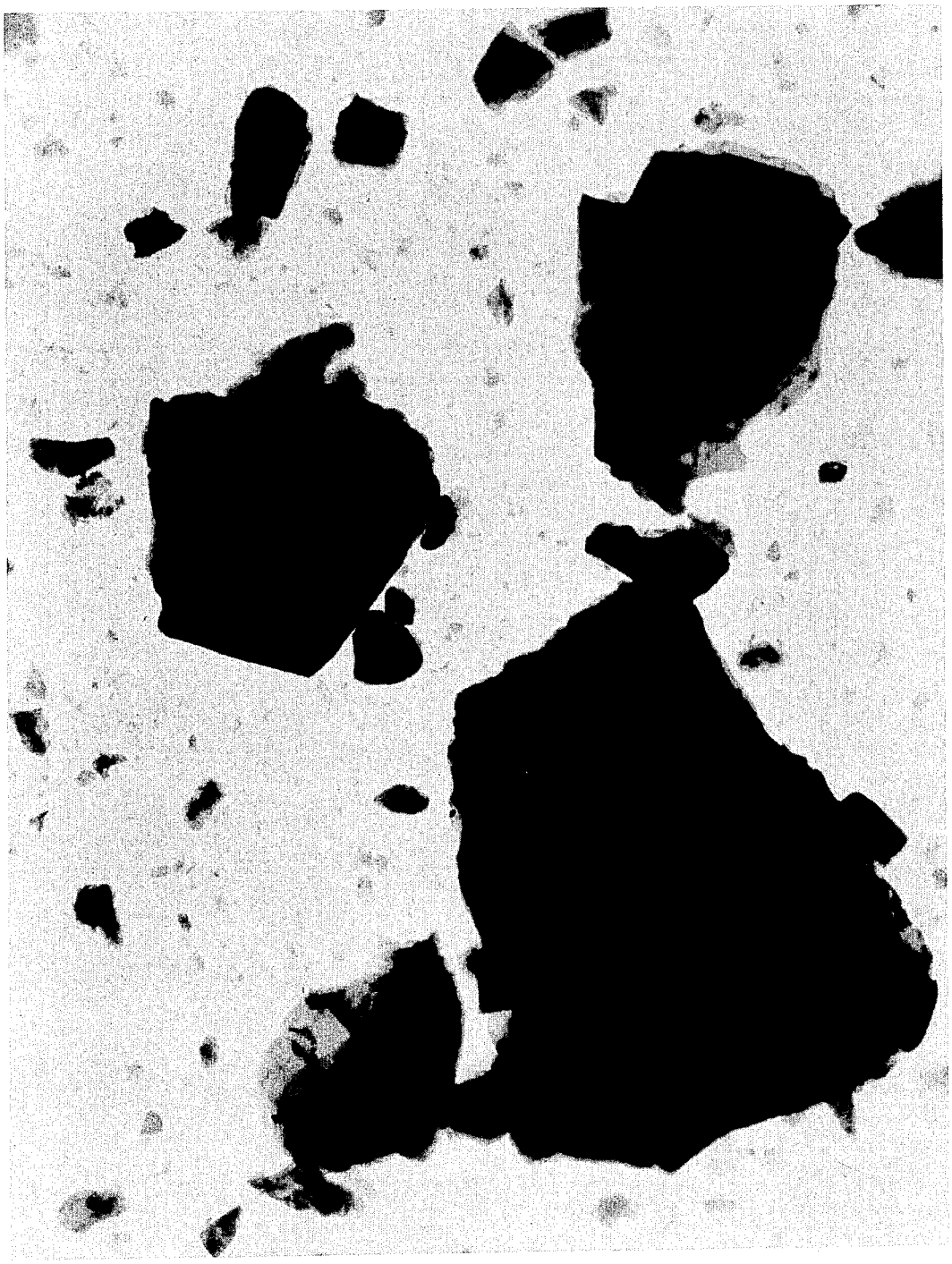
FIG. 2 is an electron micrograph of the ground alumina trihydrate starting material at 25,000 X.
Figure 3:
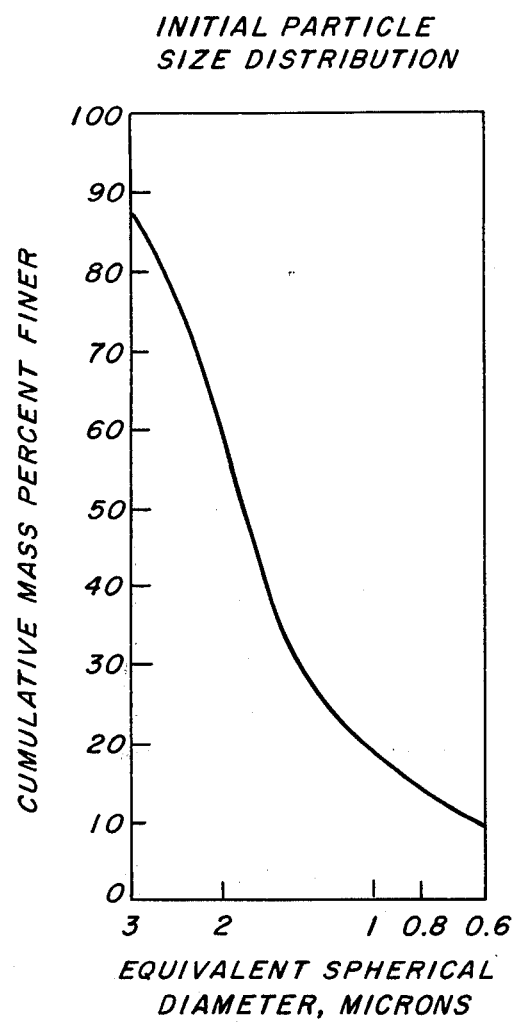
FIG. 3 is a graph showing the particle size distribution of the ground alumina trihydrate starting material.

In accordance with the invention, aluminum trihydroxide in the form of alpha alumina trihydrate (gibbsite) from the Bayer process is first ground to an average particle size of about 1–3 microns, as measured in a Fisher Sub-Sieve Sizer. This can be accomplished by feeding Bayer alumina trihydrate having an initial particle size range of 30 to 300 microns into fluid energy mills such as "Micron-Master", "Majac", "Jet-O-Mizers", "Micronizers", Sweco "Vibro-Energy" mills, and in other suitable mills for fine grinding. It should be emphasized here that the resultant ground product, while having an average or median particle size of 1–3 microns actually comprises particles having a wide disparity of size as can be seen by referring to the electron micrograph of FIG. 2 or the particle size distribution graph of FIG. 3.

The ground trihydrate is then placed in a mixer and blended with water and mineral acid to a concentration of preferably about 200 grams per liter. The amount of acid which is added at this point to assist in the subsequent digesting and control of particle size varies from about 0.003 to 0.03 moles of acid per mole of the trihydrate. While any mineral acid can be used, hydrochloric acid and nitric acid have been found to be particularly effective in aiding in the conversion of the trihydrate to monohydrate as well as the control of particle size.

An optional additional agent which may be used as an additive at this point is bleach. Suitable bleaching agents such as sodium chlorate, sodium hypochlorite, chlorine dioxide, ozone, and zinc hydrosulfite, for example, may be added to obtain a whiter monohydrate final product. The amount of bleach which may be added varies from 1 to 10 parts by weight per 1000 parts of trihydrate.

Following thorough mixing, the slurry is transferred to a suitable reaction vessel such as a series of stirred tanks, a Mixing Equipment Company "Mixer Column", a Bethlehem Corporation "Ergulator" and the like. This, for example, could advantageously be done by pumping the slurry into a pipe-type reactor using high pressure steam or other equivalent means to provide the necessary pressure and temperature in the reactor to effect the digestion. The trihydrate is digested at a temperature at about 180°–250°C and at a pressure of from 130 to 565 psi for a period of about 0.5–120 minutes. The higher the temperature, the shorter the reaction time required. If the reaction is carried out in a continuous reactor rather than a batch reaction, the reactor, such as a pipe-like reactor, is sized to permit sufficient residence time with regard to the pumping speed to provide the desired digestion time.

Following the digestion, the slurry is filtered to separate the monohydrate product from the remaining liquid, and the monohydrate is dried. It has been found that when using the specified amount of mineral acid that no further washing of the product is needed to remove undesirable salts from the product.

To illustrate the invention, alpha alumina trihydrate having an initial average particle size (Fisher) of about 45 microns was ground to an average particle size (Fisher) of 1.5 microns and a series of digests were conducted in a pipe-like reactor. Concentrations of 0.024 and 0.006 moles of acid per mole of trihydrate were used in respective digests. Both hydrochloric acid and nitric acid were tried as well as a control sample omitting any acid. In each instance the slurry was digested for about 30 minutes at a temperature of about 225°C by pumping the slurry at a 200 gram per liter concentration into a pipe-like reactor at a rate of about 20 gallons per minute. The reactor had a diameter of about 1.5 feet and a total length of 46 feet. High pressure steam was fed into the reactor at a rate of 50 pounds per minute to provide the necessary high temperature. The digested slurry was piped from the reactor into a pressure reduction and heat exchange zone and then into a vacuum filter to separate the resultant monohydrate product from the filtrate. The particle size of the resultant monohydrate product for each of the reactions was then determined. The results are tabulated in Table I.

TABLE I

| Moles of Acid per Mole of Trihydrate | Median Particle Size (Sedigraph), microns | | Average Particle Size (Fisher), microns | |
|---|---|---|---|---|
| | HCl | HNO$_3$ | HCl | HNO$_3$ |
| 0.024 | 0.15 | 0.16 | 0.30 | 0.35 |
| 0.006 | 0.27 | 0.18 | 0.50 | 0.51 |
| None (blank) | 0.68 | 0.68 | 0.60 | 0.60 |

Figure 4:
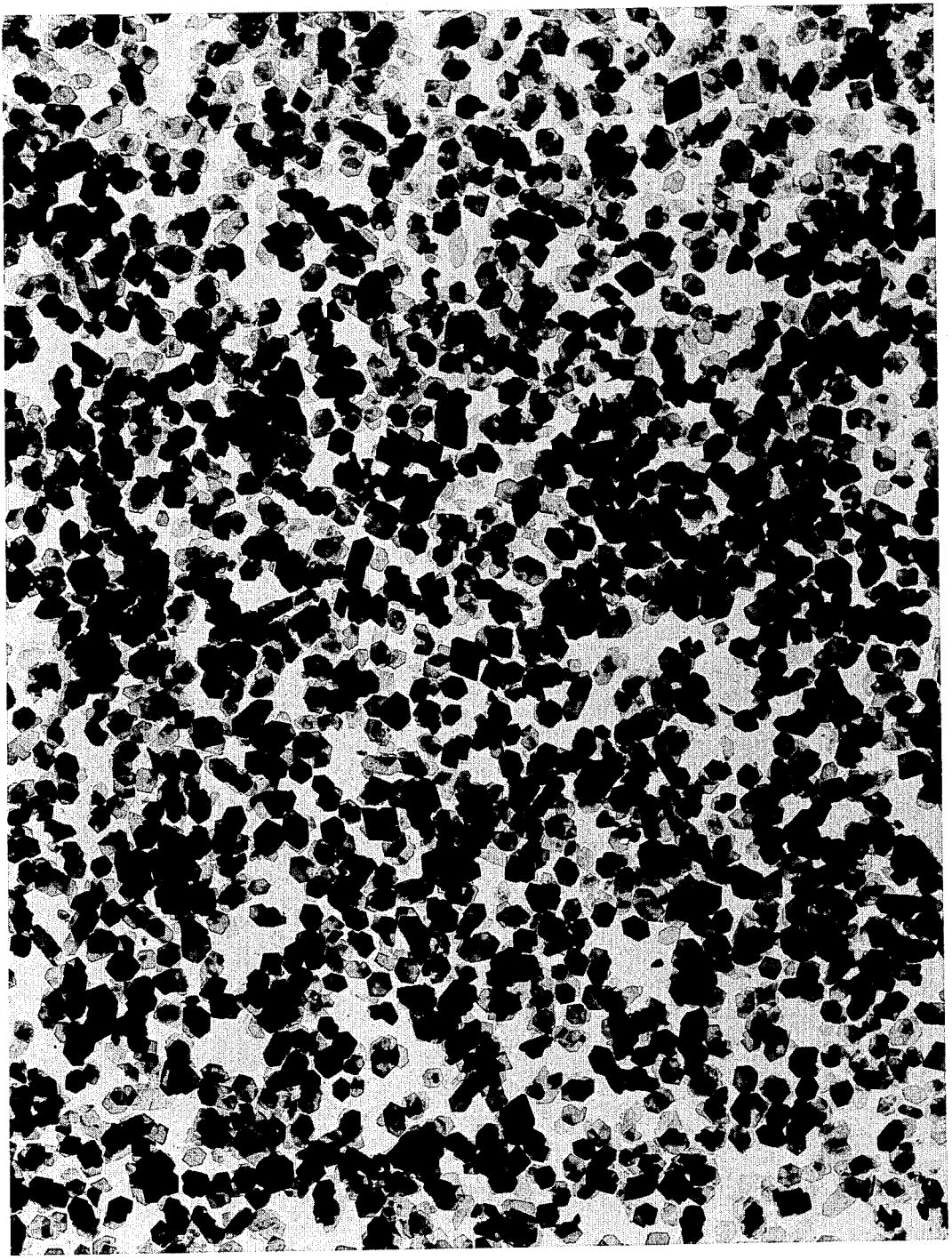
FIG. 4 is an electron micrograph of the resultant alumina monohydrate particles at 25,000 X.

Turning now to FIG. 4, one sees the uniformity of a typical resultant product obtained by digestion in accordance with the invention. The particles illustrated in FIG. 4 were obtained by digesting ground trihydrate in the presence of 0.024 moles of nitric acid per mole of trihydrate for 30 minutes at a temperature of 225°C. The resultant particles had a particle size of about 0.35 microns and, as can be seen from the figure, were very uniform in size. This is in surprising contrast to the micrograph of FIG. 2 which shows the particle size distribution of typical starting material which is used to form the monohydrate.

What is claimed is:

1. A process for the preparation of uniform size alumina monohydrate crystals having optically useful properties as pigments in paper, paint, and ink which comprises:
   a. grinding Bayer trihydrate to a median particle size of 1–3 microns;
   b. digesting the ground trihydrate at a temperature of at least 180°C and at a pressure of from 130 to 565 psi for a period of at least 30 seconds in the presence of from 0.003–0.03 moles of mineral acid per mole of hydrate; and
   c. recovering a monohydrate product having a uniform particle size and substantially in the range from 0.2 to 0.7 microns sufficiently large to be useful as a pigment.

2. The process of claim 1 wherein the digestion is performed in the presence of a bleaching agent to give monohydrates of higher brightness and whiteness.

3. The process of claim 1 wherein the shape of the resultant alumina monohydrate crystals is substantially as shown in FIG. 4.

4. A process for the preparation of 0.2–0.7 microns alumina monohydrate crystals of uniform particle size having optically useful properties as pigments in paper, paint, and ink which comprises:
   a. grinding Bayer trihydrate to a median particle size of 1–3 microns;
   b. digesting the ground trihydrate at a temperature of 180°–250°C at a pressure to 130–565 psi for a period of from 0.5–120 minutes in the presence of from 0.003–0.03 moles of mineral acid per mole of hydrate; and
   c. recovering a monohydrate product having a uniform particle size of from 0.02–0.7 microns.

5. The process of claim 4 wherein the digestion is performed in the presence of a bleaching agent to give monohydrates of higher brightness and whiteness.

* * * * *